US011328304B2

(12) United States Patent
Opalka et al.

(10) Patent No.: US 11,328,304 B2
(45) Date of Patent: May 10, 2022

(54) AUTOMATED QUEUING SYSTEM

(71) Applicant: ACF Technologies, Inc., Asheville, NC (US)

(72) Inventors: Jan Opalka, Asheville, NC (US); Jose Mora, Miami, FL (US)

(73) Assignee: ACF Technologies, Inc., Asheville, NC (US)

( * ) Notice: Subject to any disclaimer, the term of this patent is extended or adjusted under 35 U.S.C. 154(b) by 0 days.

(21) Appl. No.: 15/664,804

(22) Filed: Jul. 31, 2017

(65) Prior Publication Data

US 2018/0033015 A1  Feb. 1, 2018

Related U.S. Application Data

(60) Provisional application No. 62/420,102, filed on Nov. 10, 2016, provisional application No. 62/368,304, filed on Jul. 29, 2016.

(51) Int. Cl.

| G06Q 30/00 | (2012.01) |
|---|---|
| G06K 9/22 | (2006.01) |
| G06K 9/00 | (2006.01) |
| G06F 16/583 | (2019.01) |
| G06F 16/58 | (2019.01) |

(Continued)

(52) U.S. Cl.
CPC ......... *G06Q 30/01* (2013.01); *G06F 16/5838* (2019.01); *G06F 16/5866* (2019.01); *G06K 9/00228* (2013.01); *G06K 9/00288* (2013.01); *G06K 9/00771* (2013.01); *G06K 9/22* (2013.01); *G06F 3/017* (2013.01); *G06F 3/0482* (2013.01)

(58) Field of Classification Search
CPC . G06Q 30/01; G06F 16/5866; G06F 16/5838; G06F 3/017; G06F 3/0482; G06K 9/00288; G06K 9/00228
See application file for complete search history.

(56) References Cited

U.S. PATENT DOCUMENTS 6,059,184 A  5/2000  Ahlstrom et al.
6,771,766 B1  8/2004  Shafiee et al.
(Continued)

FOREIGN PATENT DOCUMENTS

EP  1247226 A1  10/2002
NO  322430 B1  10/2006
(Continued)

OTHER PUBLICATIONS

'Smart Queue System', [database online], Jun. 2016, retrieved on [Dec. 8, 2021], Retrieved from: The IP.com Prior Art Database, p. 3 (Year: 2016).*

(Continued)

*Primary Examiner* — Lynda Jasmin
*Assistant Examiner* — Ehrin L Pratt
(74) *Attorney, Agent, or Firm* — Nelson Mullins Riley & Scarborough LLP

(57) ABSTRACT

An automated queue is provided including processing circuitry configured to receive an image including a face of a customer, receive an indication of a selected service, enter the customer in virtual queue based on the indication of the selected service, and in response to the customer reaching the front of the virtual queue, causing a transmission of the selected service and at least a portion of the image including the face of the customer to an agent user interface.

17 Claims, 9 Drawing Sheets

(51) Int. Cl.
  *G06F 3/01*    (2006.01)
  *G06F 3/0482*  (2013.01)

(56)          References Cited

U.S. PATENT DOCUMENTS

| | | | |
|---|---|---|---|
| 7,046,790 B2 | 5/2006 | Holmen | |
| 7,516,148 B2 | 4/2009 | Waytena et al. | |
| 7,590,550 B2 | 9/2009 | Schoenberg | |
| 8,081,749 B1 | 12/2011 | Shaffer et al. | |
| 8,306,568 B2 | 11/2012 | Snyder | |
| 8,731,180 B2 | 5/2014 | Benefield et al. | |
| 8,788,607 B2 | 7/2014 | Lee et al. | |
| 8,831,963 B2 | 9/2014 | Backer et al. | |
| 9,009,702 B2 | 4/2015 | Tsirkin | |
| 9,065,916 B2 | 6/2015 | Oristian et al. | |
| 9,065,972 B1 | 6/2015 | Arthur et al. | |
| 9,164,789 B2 | 10/2015 | Tsirkin et al. | |
| 9,178,997 B2 | 11/2015 | Oristian et al. | |
| 9,332,044 B2 | 5/2016 | Cortes et al. | |
| 9,332,224 B2 | 5/2016 | Assem Aly Salama et al. | |
| 9,355,530 B1* | 5/2016 | Block | G07F 19/201 |
| 9,392,163 B2 | 7/2016 | Wu et al. | |
| 10,327,225 B2 | 3/2019 | Ande et al. | |
| 2002/0059587 A1 | 5/2002 | Cofano et al. | |
| 2002/0114323 A1* | 8/2002 | Chowdhury | H04L 61/35 370/352 |
| 2003/0035531 A1 | 2/2003 | Brown et al. | |
| 2003/0037113 A1* | 2/2003 | Petrovykh | H04L 67/04 709/205 |
| 2003/0177141 A1* | 9/2003 | Sahlin | G07C 11/00 |
| 2006/0186197 A1* | 8/2006 | Rosenberg | G06Q 30/00 235/380 |
| 2006/0253358 A1 | 11/2006 | Delgrosso | |
| 2007/0042748 A1 | 2/2007 | Macarthur | |
| 2008/0065414 A1 | 3/2008 | Schoenberg | |
| 2008/0133283 A1 | 6/2008 | Backer et al. | |
| 2009/0047461 A1 | 2/2009 | Sporrong | |
| 2009/0276704 A1 | 11/2009 | Finn et al. | |
| 2009/0325629 A1 | 12/2009 | Snyder | |
| 2010/0117790 A1 | 5/2010 | Bayne et al. | |
| 2010/0169147 A1 | 7/2010 | McCormack et al. | |
| 2010/0198647 A1 | 8/2010 | Bowers, Jr. et al. | |
| 2010/0250612 A1* | 9/2010 | Reuveni | G06Q 10/02 707/799 |
| 2010/0277276 A1 | 11/2010 | Bayne et al. | |
| 2011/0178960 A1 | 7/2011 | Dever et al. | |
| 2011/0261144 A1 | 10/2011 | Benefield et al. | |
| 2011/0307547 A1 | 12/2011 | Backer et al. | |
| 2012/0158597 A1* | 6/2012 | Malik | G06Q 30/016 705/304 |
| 2013/0030875 A1 | 1/2013 | Lee et al. | |
| 2013/0138570 A1 | 5/2013 | Ross | |
| 2013/0151296 A1 | 6/2013 | Waytena et al. | |
| 2013/0262320 A1 | 10/2013 | Makanawala et al. | |
| 2014/0046718 A1 | 2/2014 | Schiller | |
| 2014/0052463 A1 | 2/2014 | Cashman et al. | |
| 2014/0089075 A1 | 3/2014 | Sanchis et al. | |
| 2014/0100925 A1* | 4/2014 | Popescu | G06Q 30/01 705/14.4 |
| 2014/0156290 A1 | 6/2014 | Kozicki et al. | |
| 2014/0156293 A1 | 6/2014 | Kozicki et al. | |
| 2014/0270133 A1 | 9/2014 | Conway et al. | |
| 2014/0343977 A1 | 11/2014 | Macina | |
| 2014/0343995 A1 | 11/2014 | Backer et al. | |
| 2014/0355749 A1* | 12/2014 | Conway | H04M 3/5191 379/265.1 |
| 2015/0032675 A1 | 1/2015 | Huehn et al. | |
| 2015/0059002 A1* | 2/2015 | Balram | G06Q 20/00 726/28 |
| 2015/0081569 A1 | 3/2015 | Moore et al. | |
| 2015/0088782 A1 | 3/2015 | Zhang | |
| 2015/0142684 A1 | 5/2015 | Ng | |
| 2015/0170152 A1 | 6/2015 | Shaffer et al. | |
| 2015/0193997 A1 | 7/2015 | Butler | |
| 2015/0195407 A1 | 7/2015 | Kaufman | |
| 2015/0262188 A1 | 9/2015 | Franco | |
| 2015/0304227 A1 | 10/2015 | Yang et al. | |
| 2015/0304366 A1 | 10/2015 | Bader-Natal et al. | |
| 2015/0304607 A1 | 10/2015 | Bader-Natal et al. | |
| 2015/0310261 A1* | 10/2015 | Lee | G06K 9/00302 382/203 |
| 2015/0363875 A1* | 12/2015 | Guerry | G06Q 40/025 705/38 |
| 2015/0371303 A1* | 12/2015 | Suri | G06Q 30/0613 705/26.41 |
| 2016/0012375 A1* | 1/2016 | Hanson | G06Q 40/02 705/7.15 |
| 2016/0012496 A1 | 1/2016 | Hanson | |
| 2016/0078528 A1* | 3/2016 | Pradeep | G06Q 20/18 705/39 |
| 2016/0099892 A1* | 4/2016 | Palakovich | H04L 51/02 709/206 |
| 2016/0132847 A1* | 5/2016 | Sarris | G06Q 20/32 705/42 |
| 2017/0149722 A1 | 5/2017 | Fernandez Acuna et al. | |
| 2017/0161670 A1 | 6/2017 | Ng et al. | |
| 2017/0270399 A1 | 9/2017 | Ross | |
| 2018/0032939 A1* | 2/2018 | Balakrishnan | G06Q 10/06393 |

FOREIGN PATENT DOCUMENTS

| | | |
|---|---|---|
| SE | 521424 C2 | 10/2003 |
| WO | WO 2012/170958 A1 | 12/2012 |
| WO | 2014194939 A1 | 12/2014 |
| WO | WO 2014/194939 A1 | 12/2014 |
| WO | WO 2015/148695 A1 | 10/2015 |
| WO | WO 2015/164380 A1 | 10/2015 |

OTHER PUBLICATIONS

Apple Patents Ticketing System Article; The Telegraph UK; Apr. 18, 2010 Website visited Oct. 2, 2017 http://www.telegraph.co.uk/technology/apple/7598997/Apple-patents-ticketing-system.htm.

International Search Report and Written Opinion of the International Search Authority for corresponding International Application No. PCT/US2017/044718 dated Oct. 17, 2017.

International Search Report and Written Opinion of the International Search Authority for corresponding International Application No. PCT/US2017/044721 dated Oct. 20, 2017.

International Search Report and Written Opinion of the International Search Authority for corresponding International Application No. PCT/US2017/044732 dated Oct. 17, 2017.

European Search Report for EP Application No. 17835427.0 dated Jan. 14, 2020 (11 pages).

European Search Report for EP Application No. 17835423.9 dated Jan. 14, 2020 (12 pages).

Non Final Office Action in U.S. Appl. No. 15/664,815 dated Sep. 21, 2020.

U.S. Final Office Action in U.S. Appl. No. 15/664,786, dated Dec. 7, 2020, 45 pages.

Communication pursuant to Article 94(3) for EP Application No. 17835423.9 dated Feb. 18, 2021; 9 pages.

Communication pursuant to Article 94(3) for EP Application No. 17835424.7 dated Apr. 28, 2021: 9 pages.

Acharya, A. et al. "Presence Based Open Contact Center Leveraging Social Networks", [online, 2013 IFIP/IEEE International Symposium on Integrated Network Management, pp. 1-14 (Retrieved on Jan. 3, 2022)] from https://ieeexplore.ieee.org/document/6 (Year: 2013).

* cited by examiner

AUTOMATED QUEUING SYSTEM

CROSS REFERENCE TO RELATED APPLICATIONS

This application claims the benefit of U.S. Provisional Application No. 62/368,304 filed on Jul. 29, 2016, and U.S. Provisional Application No. 62/420,102 filed on Nov. 10, 2016. The entire contents of these applications are hereby incorporated herein by reference. By extension, U.S. application Ser. No. 15/664,786, the non-provisional application of the above-noted provisional application No. 62/368,304, is also hereby incorporated herein by reference.

TECHNICAL FIELD

The invention generally relates to queue management and, more particularly, relates to indicating an automated queuing system.

BACKGROUND OF THE INVENTION

For walk-in businesses, customers often end up standing in long lines (or "queues") while waiting for their service provider, which can create a frustrating experience for the customer. In recent years, electronic queue management systems ("QMSs") have been developed to manage customer reception and flow management, converting physical lines of people into virtual queues. Customers can then relax in a comfortable lobby environment or leave the lobby to roam and are notified by various means when they have reached the front of the virtual queue and should advance to meet with a service provider in the location. Queue management systems, however, are functionally limited by the number of available service providers in the facility. Accordingly, customer wait times may be lengthy and frustrating even if the customers are not physically standing in lines.

Some queuing systems may place customers into a virtual queue and/or attempt to retrieve customer information by having the customer fill out an electronic information form. Filling out the electronic information form may be tedious or time consuming, which may lead to a customer not filling out or only partially filling out the electronic information form. In some instances the electronic information form may include fields to which the customer does not know the answer or cannot immediately answer. In such as instance, the customer may stop filling out the electronic information form or may delay queuing by attempting to locate answers to the fields, such as by calling other persons, looking in notebooks, or the like. Incomplete or partially filled electronic information forms may be ineffective in placing the customers in a virtual queue and/or retrieving customer data, which may slow service, when the customer is served, if the customer data is needed for the transaction.

BRIEF SUMMARY OF THE INVENTION

In an example embodiment, an automated queue may be provided including processing circuitry configured to receive an image including a face of a customer, receive an indication of a selected service, enter the customer in virtual queue based on the indication of the selected service, and in response to the customer reaching the front of the virtual queue, causing a transmission of the selected service and at least a portion of the image including the face of the customer to a agent user interface.

BRIEF DESCRIPTION OF THE DRAWING(S)

Having thus described the automated queue in general terms, reference will now be made to the accompanying drawings, which are not necessarily drawn to scale, and wherein:

Figure 4A:
FIG. 4A illustrates an image capture according to an example embodiment.
Figure 4B:
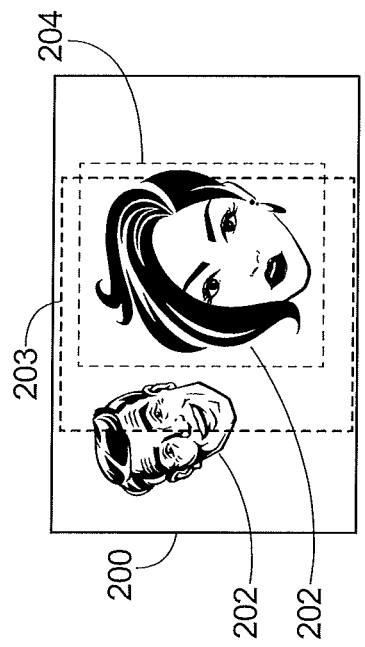
Figure 4C:
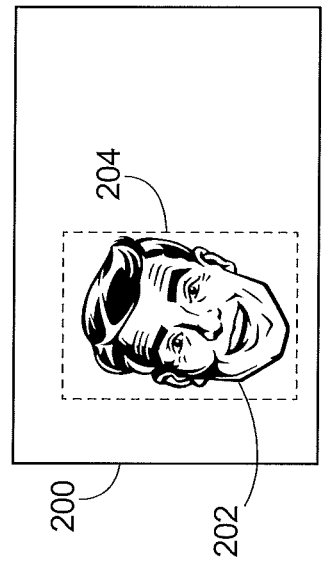
Figure 4D:
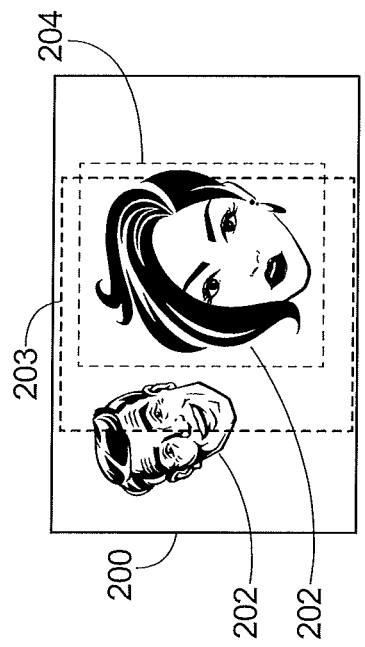
Figure 5:
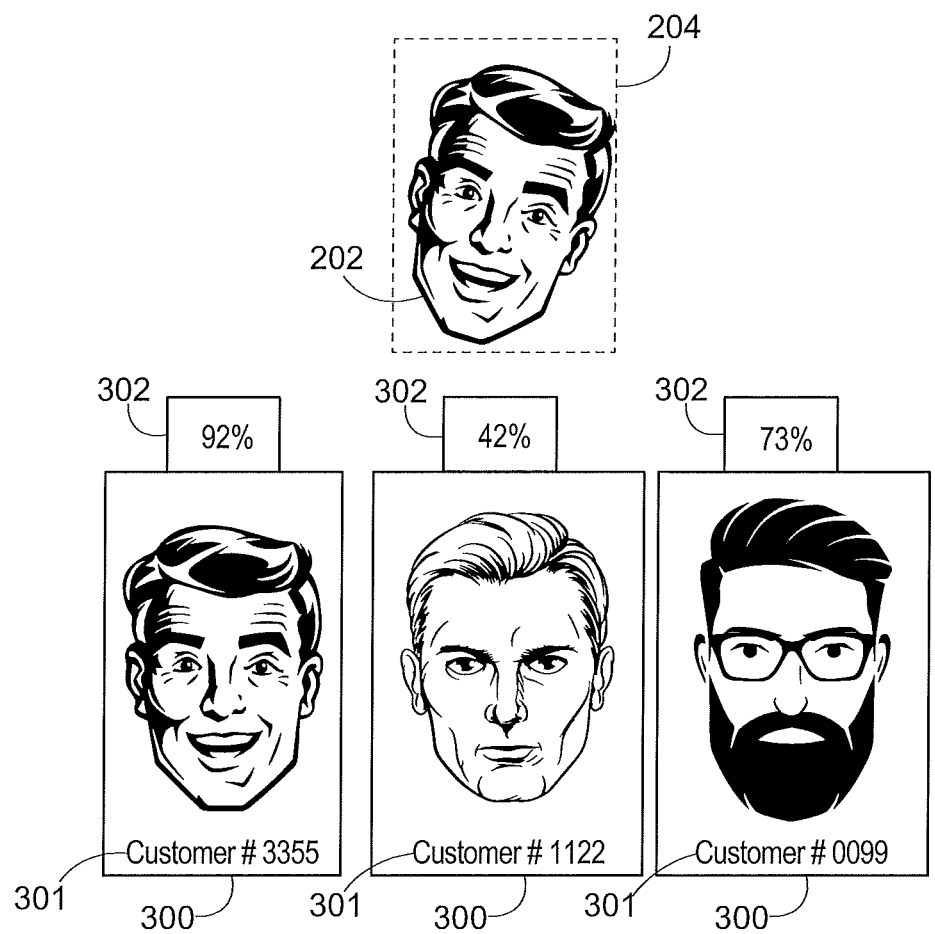
Figure 6A:
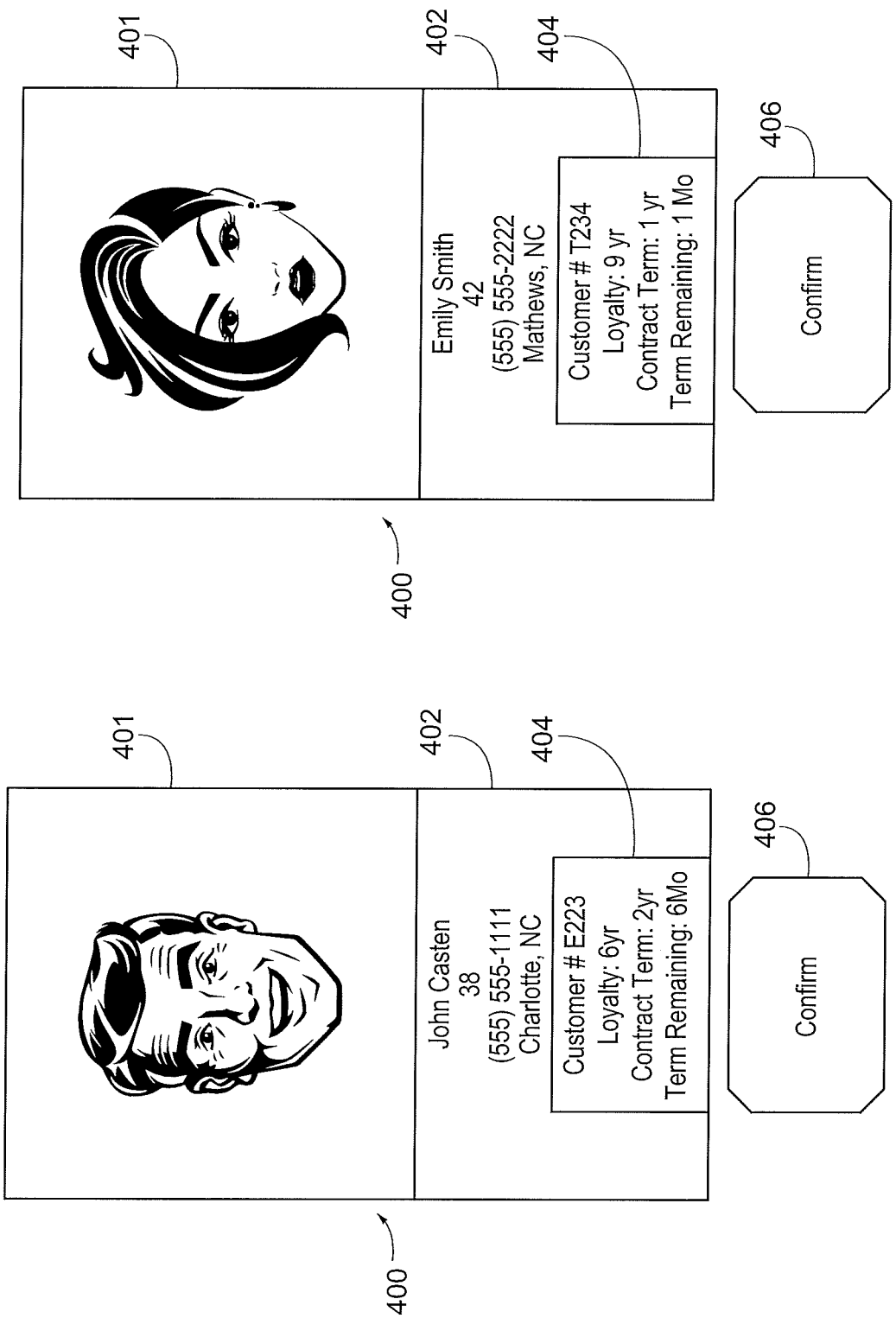
Figure 6B:
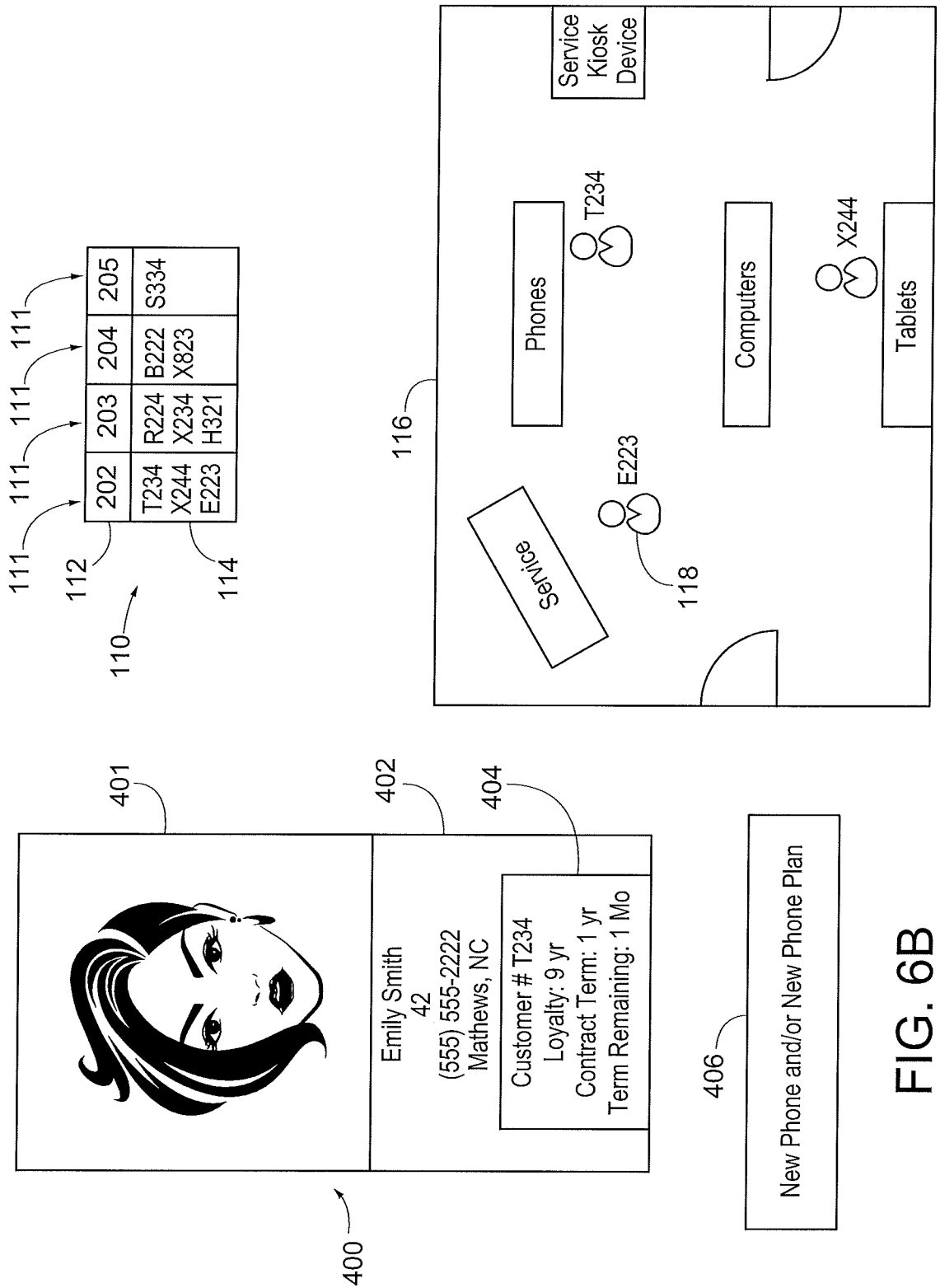
Figure 7:
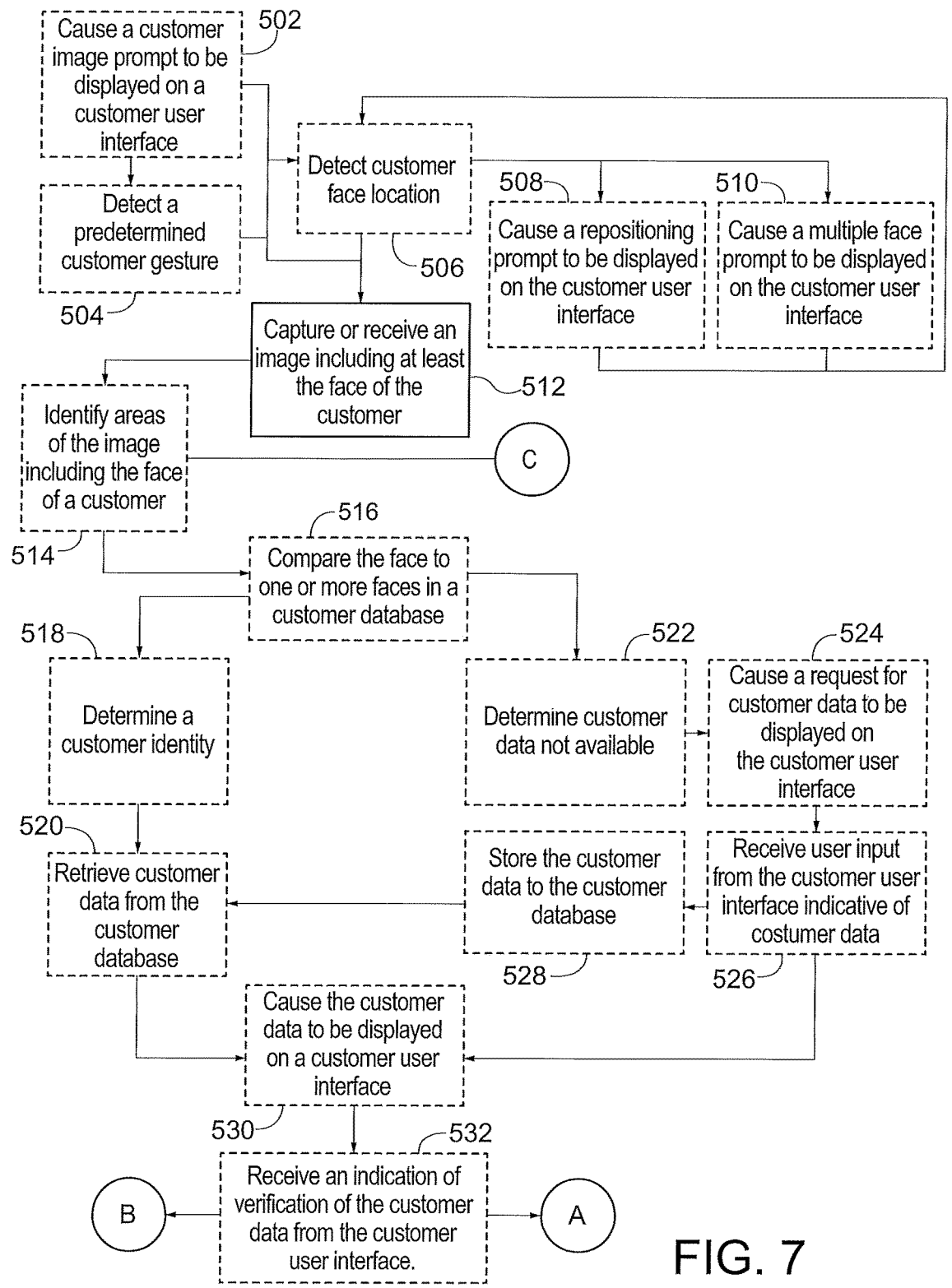
Figure 8:
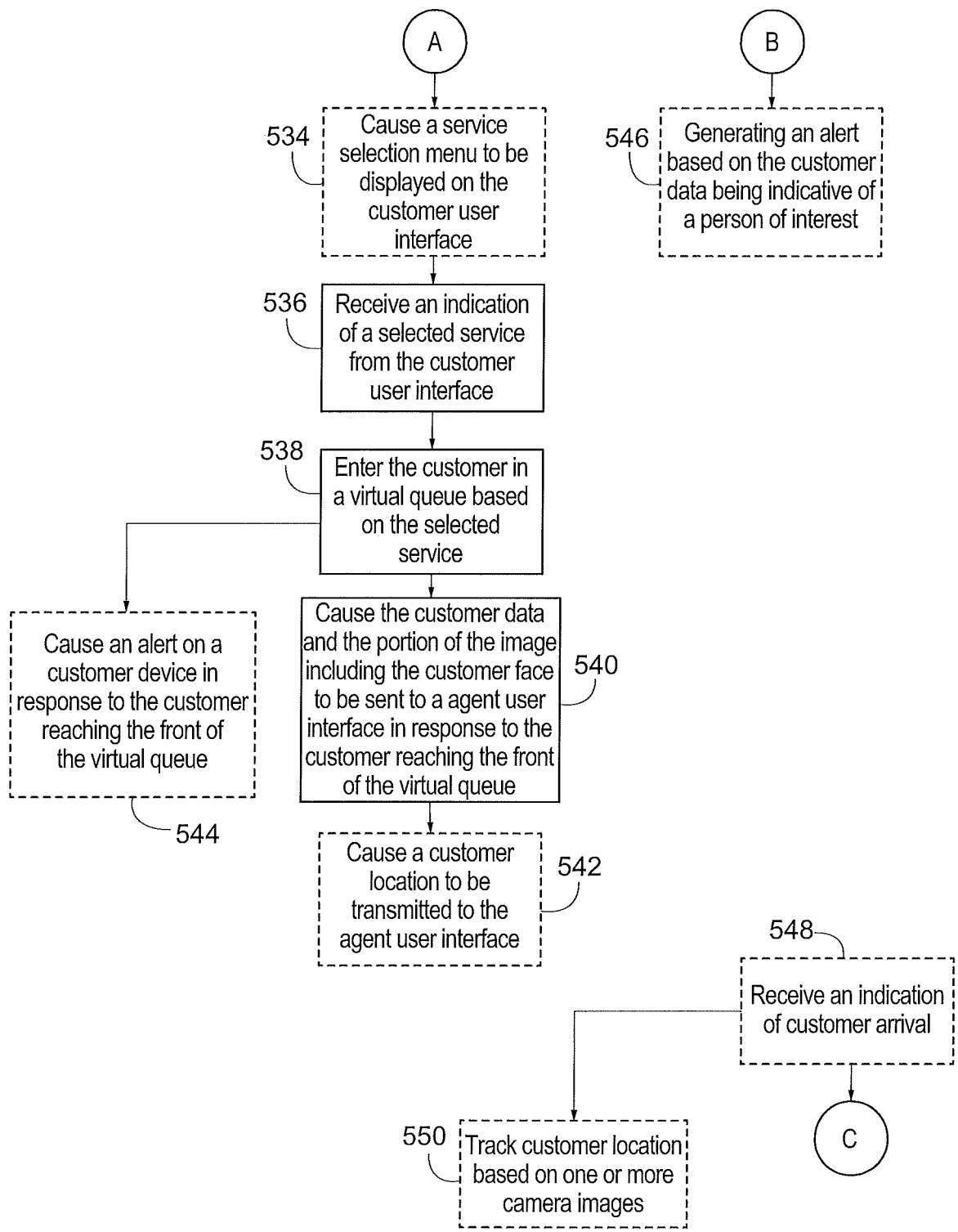

FIGS. 4B-D illustrate example images according to an example embodiment;

FIG. 5 illustrates a facial comparison according to an example embodiment;

FIG. 6A illustrates example customer data according to an example embodiment;

FIG. 6B illustrates an example agent user interface including a virtual queue according to an example embodiment; and FIGS. 7 and 8 illustrate methods of automated queuing according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

As used in herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide an automated queue which may be configured to receive an image including a customer face from a service kiosk, an in-store camera, a customer device, or the like. The automated queue may also receive information indicative of a selected service and enter the customer in a virtual queue based on the selected service. When the customer reaches the front of the virtual queue, the customer's face and the selected service may be transmitted to an agent user interface to begin a transaction. This may avoid entering or writing out customer information, as the customer's face is used in the virtual queue.

In some example embodiments, the automated queue may compare the customer face to one or more customer faces in a customer database. In an instance in which a customer identity is determined, the automated queue may retrieve customer data, which may be also transmitted to the agent user interface. In an example embodiment, the customer may verify the retrieved customer data. The customer data may therefore be provided to the agent without any writing or entering of data. In an instance in which no customer data is retrieved, the customer may enter the customer data to be stored in the customer database for future use.

In some example embodiments, the automated queue may generate an alert in an instance in which an identified customer is a person of interest, such as an important client, previous shoplifter, or the like.

In an example embodiment, the automated queue may receive location information, such as from a location sensor associated with a user device, or determine a customer location, such as by camera triangulation.

Figure 1:
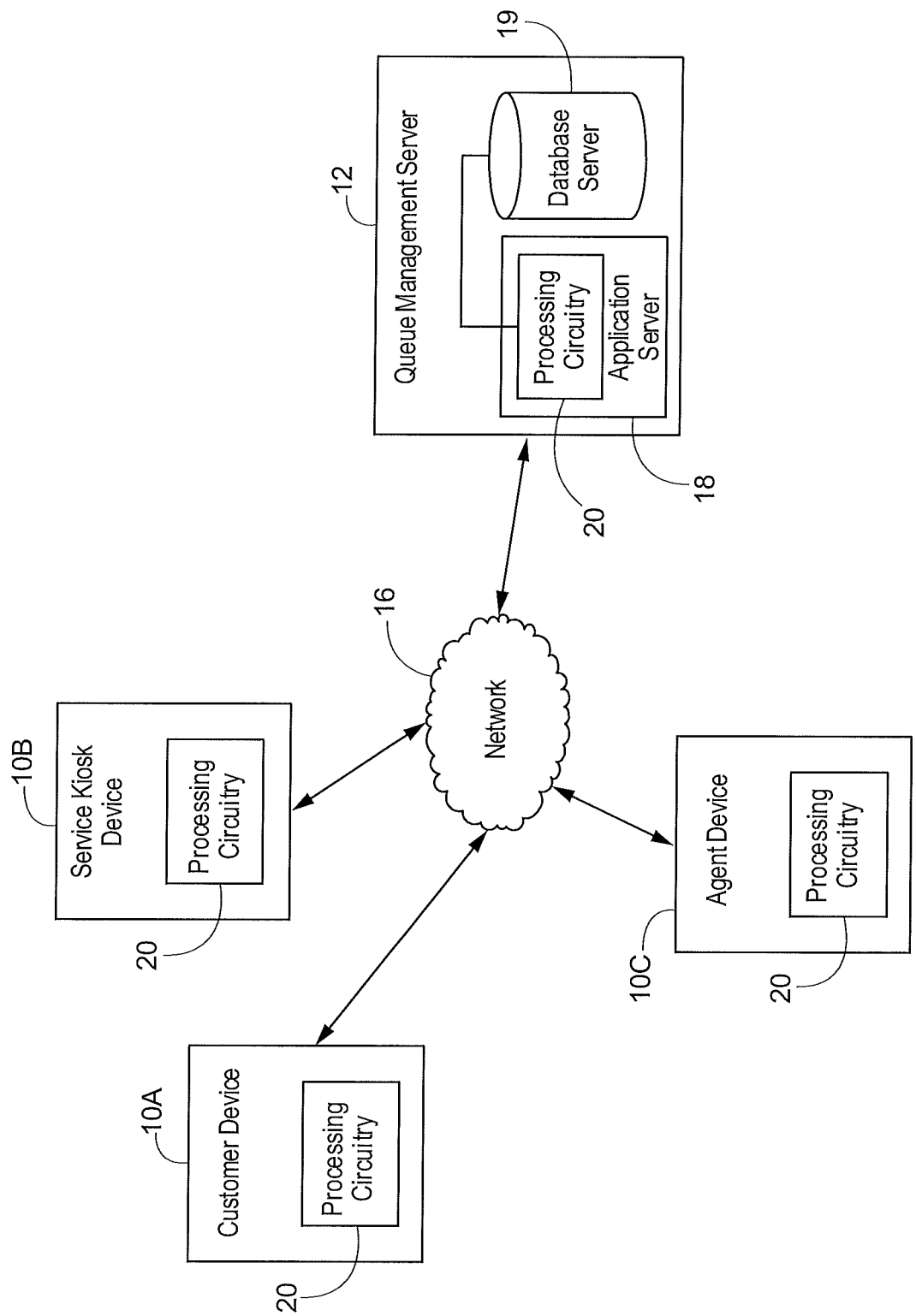
FIG. 1 illustrates a block diagram of a system according to an example embodiment.

FIG. 1 illustrates an example system in which an embodiment of the present invention may be employed. The system may include one or more devices 10, e.g. customer devices 10A, service kiosk devices 10B, agent devices 10C, or the like. Each one of the devices 10 may include or otherwise be embodied as computing device (e.g. a computer, a network access terminal, a personal digital assistant (PDA), cellular phone, smart phone, wearable computer, service kiosk, or the like) capable of communication with a network 16. As such, for example, each one of the devices 10 may include (or otherwise have access to) memory for storing instructions or applications for the performance of various functions and a corresponding processor or processing circuitry 20 for executing stored instructions or applications. Each one of the devices 10 may also include software and/or corresponding hardware for enabling the performance of the respective functions of the devices 10, as described below. In an example embodiment, one or more of the devices 10 may include a client application configured to operate in accordance with an example embodiment of the present invention. In this regard, for example, the client application may include software for enabling a respective one of the devices 10 to communicate with the network 16 for requesting and/or receiving information and/or services via the network 16. Moreover, in some embodiments, the information or services that are requested via the network may be provided in software as a service (SAS) environment. The information or services receivable at the client applications may include deliverable components (e.g. downloadable software to configure the user devices 10, or information for consumption/processing at the devices 10). As such, for example, the client application may include corresponding executable instructions for configuring the user devices 10 to provide corresponding functionalities for automated queuing, as described in greater detail below.

The network 16 may be a data network, such as a local area network (LAN), a metropolitan area network (MAN), a wide area network (WAN) (e.g. the Internet), and/or the like, which may couple the devices 10 to devices such as processing elements (e.g. personal computers, server computers or the like) and/or databases. Communication between the network 16, the user devices 10 and the devices or databases (e.g. servers) to which the devices 10 are coupled may be accomplished by either wireline or wireless communication mechanisms and their corresponding communications protocols.

In an example embodiment, devices to which the devices 10 may be coupled via the network 16 may include one or more servers, e.g. application servers 18 and/or database servers 19 (e.g. queue management server 12). It is noted that the example embodiments of the system discussed herein are scalable to include any number of servers or devices 10. Similarly, a server 12 may have one or a plurality of application servers 18 and/or database servers 19. Although the application server 18 and the database server 19 are each referred to as "servers," this does not necessarily imply that they are embodied on separate servers or devices. As such, for example, a single server or device may include both entities and the database server 19 could merely be represented by a database or group of databases physically located on the same server or device as the application server 18. The application server 18 and the database server 19 may each include hardware and/or software for configuring the application server 18 and the database server 19, respectively, to perform various functions. As such, for example, the application server 18 may include processing circuitry 20, including a processor and memory enabling the application server 18 to access and/or execute stored computer readable instructions for performing various functions. In an example embodiment, one function that may be provided by the application server 18 may be the provision of access to information and/or services related to operation of the terminals or computers with which the devices 10 are associated. For example, the application server 18 may be configured to provide for storage of information descriptive of financial account data or product pricing data. In some cases, these contents may be stored in the database server 19. Alternatively or additionally, the application server 18 may be configured to provide analytical tools for use by the devices 10 in accordance with example embodiments.

Figure 2:
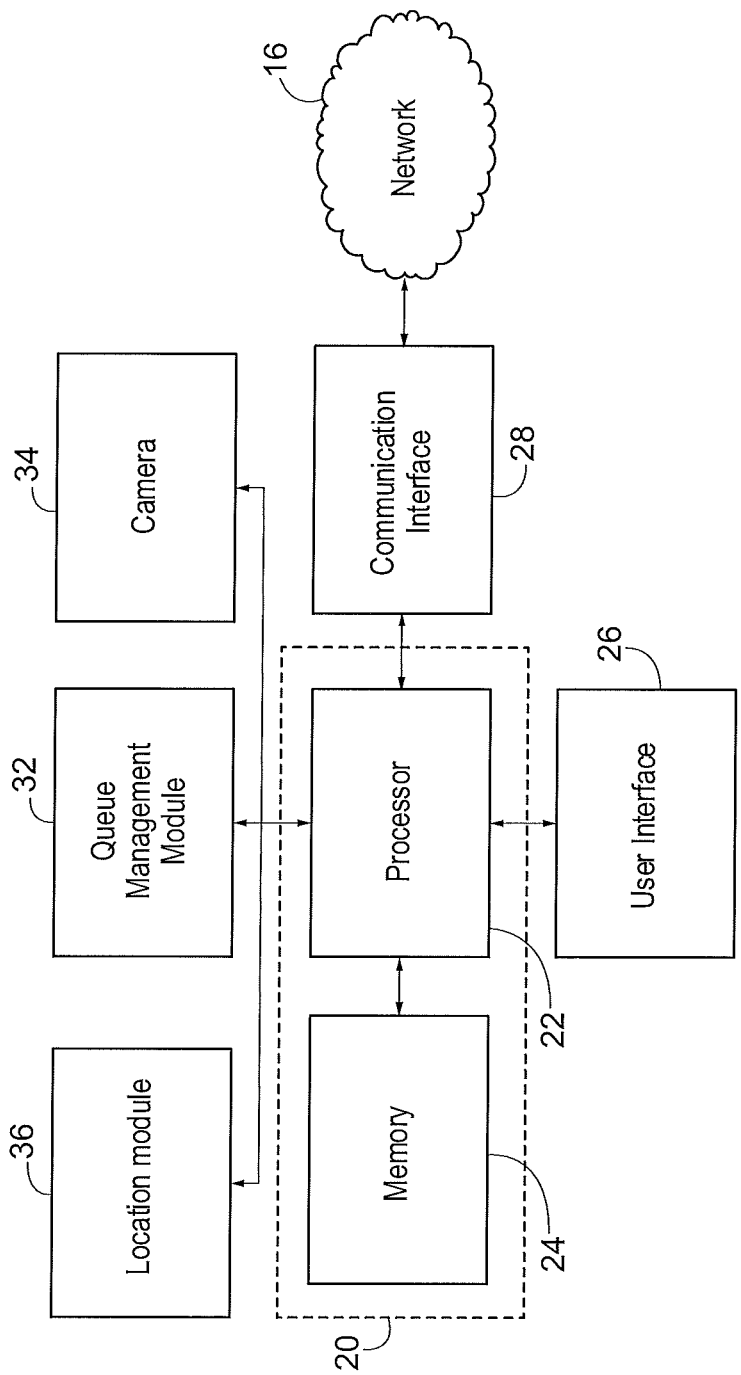
FIG. 2 illustrates a block diagram of an apparatus for an automated queue according to an example embodiment.

In some embodiments, for example, the application server 18 may therefore include an instance of a queue management module 32, shown in FIG. 2, comprising stored instructions for handling activities associated with practicing example embodiments as described herein. As such, in some embodiments, the devices 10 may access the queue management module 32 online and utilize the services provided thereby. However, it should be appreciated that in other embodiments, the queue management module 32 may be provided from the application server 18 (e.g. via download over the network 16) to one or more of the user devices to enable recipient devices 10 to instantiate an instance of the queue management module 32 for local operation. As yet another example, the queue management module 32 may be instantiated at one or more of the devices 10 responsive to downloading instructions from a removable or transferable memory device carrying instructions for instantiating the queue management module 32 at the corresponding one or more of the devices 10. In such an example, the network 16 may, for example, be a peer-to-peer (P2P) network where one of the user devices includes an instance of the queue management module 32 to enable one of the user devices to act as a server to the other user devices. In a further example embodiment, the queue management module 32 may be distributed amongst one or more devices 10 and/or the application server 18.

In an example embodiment, the application server 18 may include or have access to memory (e.g. internal memory or the database server 19) for storing instructions or applications for the performance of various functions and a corresponding processor for executing stored instructions or applications. For example, the memory may store the queue management module 32 configured to operate in accordance with an example embodiment of the present invention. In this regard, for example, the queue management module 32 may include software for enabling the application server 18 to communicate with the network 16 and/or the device 10 for the provision and/or receipt of information associated with performing activities as described herein. Moreover, in some embodiments, the application server 18 may include or otherwise be in communication with an access terminal (e.g. a computer including a user interface) via which analysts may interact with, configure or otherwise maintain the system.

An example embodiment will now be described with reference to FIG. 2. FIG. 2 shows certain elements of an apparatus for management of a virtual queue according to an example embodiment. The apparatus of FIG. 2 may be employed, for example, on a device (e.g. any of the devices 10 of FIG. 1) or a variety of other devices (such as, for example, a network device, server, proxy, or the like (e.g. an application server 18 of FIG. 1)). Alternatively, embodiments may be employed on a combination of devices. Accordingly, some embodiments of the present invention may be embodied wholly at a single device (e.g. the application server 18 or one or more devices 10) or by devices in a client/server relationship (e.g. the application server 18 and one or more user devices). Furthermore, it should be noted that the devices or elements described below may not be mandatory and thus some may be omitted in certain embodiments.

In an example embodiment, the apparatus may include or otherwise be in communication with processing circuitry 20 that is configured to perform data processing, application execution and other processing and management services according to an example embodiment of the present invention. In one embodiment, the processing circuitry 20 may include a memory 24 and a processor 22 that may be in communication with or otherwise control a user interface 26 and a communication interface 28. As such, the processing circuitry 20 may be embodied as a circuit chip (e.g. an integrated circuit chip) configured (e.g. with hardware, software or a combination of hardware and software) to perform operations described herein. However, in some embodiments, the processing circuitry 20 may be embodied as a portion of a server, computer, laptop, workstation or even one of various mobile computing devices or wearable computing devices. In situations where the processing circuitry 20 is embodied as a server or at a remotely located computing device, the user interface 26 may be located on another device (e.g. at a computer terminal or client device such as one of the devices 10) that may be in communication with the processing circuitry 20 via the device interface 28 and/or a network (e.g. network 16).

The user interface 26 may be an input/output device for receiving instructions directly from a user. The user interface 26 may be in communication with the processing circuitry 20 to receive a user input via the user interface 26 and/or to present output to a user as, for example, audible, visual, mechanical or other output indications. The user interface 26 may include, for example, a keyboard, a mouse, a joystick, a display (e.g. a touch screen display), a microphone, a speaker, or other input/output mechanisms. Further, the processing circuitry 20 may comprise, or be in communication with, user interface circuitry configured to control at least some functions of one or more elements of the user interface 26. The processing circuitry 20 and/or user interface circuitry may be configured to control one or more functions of one or more elements of the user interface 26 through computer program instructions (e.g. software and/or firmware) stored on a memory device accessible to the processing circuitry 20 (e.g. volatile memory, non-volatile memory, and/or the like). In some example embodiments, the user interface circuitry is configured to facilitate user control of at least some functions of the apparatus through the use of a display configured to respond to user inputs. The processing circuitry 20 may also comprise, or be in communication with, display circuitry configured to display at least a portion of a user interface 26, the display and the display circuitry configured to facilitate user control of at least some functions of the apparatus.

The communication interface 28 may be any means embodied in either hardware (e.g., device or circuitry), software, or a combination of hardware and software that is configured to receive and/or transmit data from/to a network and/or any other device or module in communication with the apparatus. The communication interface 28 may also include, for example, an antenna (or multiple antennas) and supporting hardware and/or software for enabling communications with the network 16 or other devices (e.g. a device 10). In some environments, the communication interface 28 may alternatively or additionally support wired communication. As such, for example, the communication interface 28 may include a communication modem and/or other hardware/software for supporting communication via cable, digital subscriber line (DSL), universal serial bus (USB) or other mechanisms. In an exemplary embodiment, the communication interface 28 may support communication via one or more different communication protocols and/or methods. In some cases, IEEE 802.15.4 based communication techniques such as ZigBee or other low power, short range communication protocols, such as a proprietary technique based on IEEE 802.15.4 may be employed along with radio frequency identification (RFID) or other short range communication techniques.

In an example embodiment, the memory 24 may include one or more non-transitory storage or memory devices such as, for example, volatile and/or non-volatile memory that may be either fixed or removable. The memory 24 may be configured to store information, data, applications, instructions or the like for enabling the apparatus to carry out various functions in accordance with example embodiments of the present invention. For example, the memory 24 could be configured to buffer input data for processing by the processor 22. Additionally or alternatively, the memory 24 could be configured to store instructions for execution by the processor 22. As yet another alternative, the memory 24 may include one of a plurality of databases (e.g. database server 19) that may store a variety of files, contents or data sets. Among the contents of the memory 24, applications (e.g. client applications or service application) may be stored for execution by the processor 22 in order to carry out the functionality associated with each respective application.

The processor 22 may be embodied in a number of different ways. For example, the processor 22 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 22 may be configured to execute instructions stored in the memory 24 or otherwise accessible to the processor 22. As such, whether configured by hardware or software methods, or by a combination thereof, the processor 22 may represent an entity (e.g. physically embodied in circuitry) capable of performing operations according to embodiments of the present invention while configured accordingly. Thus, for example, when the processor 22 is embodied as an ASIC, FPGA or the like, the processor 22 may be specifically configured hardware for conducting the operations described herein. Alternatively, as another example, when the processor 22 is embodied as an executor of software instructions, the instructions may specifically configure the processor 22 to perform the operations described herein.

In an example embodiment, the processor 22 (or the processing circuitry 20) may be embodied as, include or otherwise control the product analysis module 32, which may be any means, such as, a device or circuitry operating in accordance with software or otherwise embodied in hardware or a combination of hardware and software (e.g. processor 22 operating under software control, the processor 22 embodied as an ASIC or FPGA specifically configured to perform the operations described herein, or a combination thereof) thereby configuring the device or circuitry to perform the corresponding functions of the queue management module 32, as described below.

The queue management module 32 may include tools to facilitate product analysis via the network 16. In an example embodiment, the queue management module 32 may be configured to receive an image including a face of a customer, receive an indication of a selected service, enter the customer in virtual queue based on the indication of the selected service, and in response to the customer reaching the front of the virtual queue, causing a transmission of the selected service and at least a portion of the image including the face of the customer to an agent user interface.

In an example embodiment, the apparatus may include one or more cameras 34 in communication with the processing circuitry 20. The cameras 34 may be configured to capture fixed or moving images of the surrounding environment. In some cases, the images may include one or more subjects, e.g. customer faces.

In some example embodiments, the apparatus may also include a location module 36 in communication with the processing circuitry 20. The location module 36 may include one or more location sensors, such as global positioning sensors (GPS), radio frequency identification (RFID) sensors, near field communications (NFC) sensors, or the like. The location sensors may be configured to receive location data associated with the apparatus or determine location data based on sensor data, such as triangulation or proximity. The location data may be indicative of an actual or relative location of the apparatus.

Figure 3:
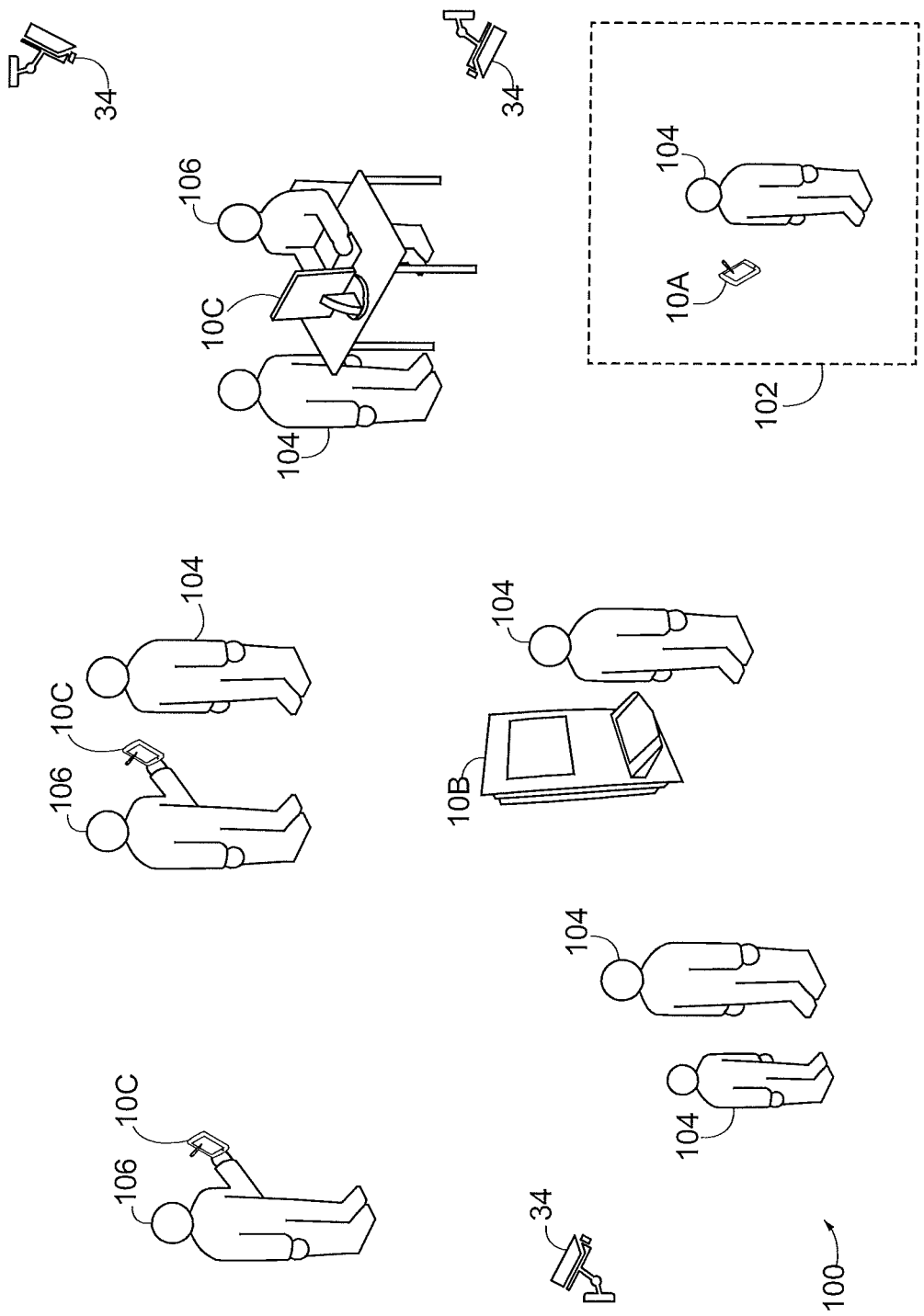
FIG. 3 illustrates a service environment according to an example embodiment.

FIG. 3 illustrates a service environment 100 according to an example embodiment. The service environment 100 may include one or more cameras 34, one or more customers 104 and one or more agents 106 to facilitate transactions for goods or services. The service environment 100 may also include one or more devices 10. For example, one or more customer devices 10A may be associated one or more of the customers 104, one or more or more service kiosk devices 10B may be associated with the service environment 100, and/or one or more agent devices 10C may be associated with one or more of the agents 106.

The automated queue may receive a customer image captured by the camera 34. The camera 34 may be associated with the service environment 100, for example, a closed circuit television (CCTV), a camera 34 mounted above a customer user interface of the service kiosk device 10B, or the like. In some embodiments, the camera 34 may be associated with a customer device 10A within the service environment 100 or at a remote location 102, such as the customer's home. The image may be a fixed image or a frame of a moving image, e.g. video.

In some example embodiments, the customer image may be automatically captured by camera 34 in response to an indication of the customer's arrival to the service environment 100, such as in response to opening a door, crossing a threshold, entering a predetermined area of the service environment 100, standing in front of the service kiosk device 10B, or the like. In an example embodiment, the automated queue may cause a customer image prompt to be displayed on a customer user interface, such as the user interface 26 of the customer device 10A or service kiosk device 10B. The customer image prompt may include instructions for the customer, such as "please stand in front of the camera and press here to take your customer image," "select or take a photo," or the like. The customer may follow the instructions for the image to be captured and received by the automated queue. Additionally or alternatively, the automated queue may automatically capture the customer image in response to the customer following a specific customer image prompt including a customer gesture, such as "raise your hand," "wave," or the like, as depicted in FIG. 4A.

In an example embodiment, the automated queue may be configured to detect a face location in the image, such as by utilizing object recognition. The object recognition may include appearance based methods, such as edge matching, divide and conquer, grayscale matching, gradient matching, histogram of receptive responses, large model bases, or the like; feature based methods, such as interpretation trees, hypothesis and test, pose consistency, pose clustering, invariance, geometric hashing, scale-invariant feature transform (SIFT), speed up robust features (SURF), or the like; genetic algorithms; or the like. FIGS. 4B-C illustrate example images 200 according to an example embodiment. The customer image 200 may include a customer face 202.

The automated queue may cause a repositioning prompt to be displayed, such as a target area of the image. The repositioning prompt may be initially displayed in association with the customer image prompt or may be displayed in response to capturing a customer image 200 in which the customer face 202 does not satisfy one or more predetermined capture or use criteria, such as the customer face 202 being visible, within a predetermined size or proportion range, in a predetermined area of the image 203, or the like. The automated queue or the customer 104 may cause the customer image 200 to be recaptured in response to the customer face 200 fails to satisfy one or more of the predetermined capture or use criteria.

In some example embodiments, the image 200 may include two or more customer faces 202, such as depicted in FIG. 4D. The automated queue may process all of the customer faces as described below, or may display a multiple face prompt on the user interface. The multiple face prompt may inform the customer that multiple customer images 202 are within the image 200. The automated queue or the customer may recapture the image 200, in response to one face, e.g. the customer's face 202, being within the image 200.

In some example embodiments, the automated queue may identify one or more areas 204 of the image 200 including a customer face 202. The automated queue may identify the areas 204, using object recognition, as discussed above. The automated queue may crop the image 200 to the area 204 including the customer face 202 and/or further process the area 202 including the customer face 202.

The automated queue may compare the area 204 including the customer face 204 to one or more faces 300 in a customer database. FIG. 5 illustrates a facial comparison according to an example embodiment. The faces 300 may include a face of a customer 104 and a customer identifier. The comparison of the customer face 202 to the one or more faces 300 may include facial recognition, such as traditional, 3-dimensional recognition, skin texture analysis, thermal analysis, and/or the like. Traditional recognition methods may include, without limitation, principal component analysis using eigenfaces, linear discriminant analysis, elastic bunch graph matching using the Fisherface algorithm, the hidden Markov model, the multilinear subspace learning using tensor representation, and the neuronal motivated dynamic link matching. The automated queue may determine a customer identity based on the facial recognition, such as a face match.

In some example embodiments, the automated queue may generate a probability score 302 for one or more of the faces 300 in the customer database based on the comparison of the customer face 202 to the faces 300, such as a percent match. The automated queue may compare the probability score 302 of the one or more faces 300 in customer database to a predetermined match threshold, such as 70 percent, 75 percent, 90 percent, or the like. The automated queue may select a face 300, e.g. determine a customer identity, based on satisfying, e.g. exceeding, the predetermined match threshold. In an instance in which multiple faces 300 satisfy the predetermined match threshold or no faces 300 satisfy the predetermined match threshold, the automated queue may display one or more faces 300, such as the faces 300 with the highest, e.g. closest match based on the comparison to the customer face 202, on the customer user interface. The automated queue may receive user input indicative of the face 300 which depicts the customer, thereby determining the customer identity, or indicative of no face 300 depicting the customer.

In an instance in which the customer identity is determined, the automated queue may retrieve customer data associated with the customer identity, e.g. stored in association with the face 300 depicting the customer. Customer data may include, name, customer identifier, age, occupation, income, relationship status, address, phone numbers, email addresses, service history, purchase history, veteran status, or any other pertinent information regarding the customer.

In an instance in which the automated queue determines that customer data is not available, e.g. no determination of a customer identity based on the comparison of the customer face 202 to the one or more faces 300 in the customer database, the automated queue may cause a request for customer data to be displayed on the customer user interface. The automated queue may receive user input from the customer user interface indicative of customer data. For example form fields may be filled by a customer by typing, stylus, selection menus, or the like. The customer data may be stored in the customer database in association with the portion of the image 200 including the customer face 202.

In an example embodiment, the customer data received from the customer user interface may match or partially match customer data stored in the customer database which is not associated with a customer face. The automated queue may cause the portion of the image 200 including the customer face 202 to be stored in associated with the stored customer data. In some instances an agent may capture the customer image for storage in association with the customer data. In some examples, the customer data received from the customer user interface may match or partially match customer data stored in the customer database, but did not match the customer face 202 of the customer image 200. The failure to match may be caused by a change of appearance, such as growing out or cutting hair, change in weight, or the like. The automated queue may update a stored customer image with the customer image 200 including the customer's face 202.

In an example embodiment, the customer data or a portion of the customer data may be displayed on the customer user interface for the customer to verify. FIG. 6A illustrates example customer data 400 according to an example embodiment. The customer data 400 may include a customer face image 401, which may be a portion of the image 200 including the customer face 202, a previously captured image, or the like. The customer data 400 may also include an information portion 402 including name, age, phone number, address, customer identification number length of customer loyalty, current contract term, remaining term, or the like. In some example embodiments, the information portion may be separated into customer information and agent information 404. The customer information may include the name, age, phone number, home city, and similar details about the customer. The agent information 404 may include information useful to the agent to provide service and/goods to the customer, such as the customer identification number length of customer loyalty, current contract term, remaining term, or the like.

The customer face image 401 and/or the customer information or portion of the customer information may be displayed on a customer user interface for the user to verify. The automated queue may receive an indication of verification of the customer data, such as an indication of a confirm button or touch area 406 being selected by the customer.

Additionally or alternatively, the automated queue may display the customer data, such that the customer may correct or update one or more fields. In some example embodiments, an update button, touch area or the like may be provided for the customer to update the customer data. Changes to the customer data may be stored in the customer database.

In an example embodiment in which the automated queue identifies multiple customers in the customer image 200, as discussed above, the automated queue may cause customer data associated with each of the identified customers 104 to be displayed for verification. The customer data may be displayed sequentially, or together, such in split screen. Additionally, the automated queue may cause a group query prompt to be displayed requesting confirmation of which customer faces 202 faces belong to the same service transaction. The automated queue may receive user input from the customer user interface indicating groups of customers 104, which may be further processed together, and/or individual customers 104, with may be processed separately.

In an example embodiment, in which the customer fails to provide customer data and no customer data is stored in the customer database, a default customer identifier may be assigned and associated with the customer image 200 including the customer face 202.

In an example embodiment, the automated queue may cause a service selection menu to be displayed on the user interface. The service selection menu may be successive menu options, dropdown menus or the like. The customer may select one or more services using the customer user interface. The automated queue may receive an indication of the selected one or more services from the customer user interface and enter the customer into a virtual queue 110, such as depicted in FIG. 6B.

The virtual queue 110 may include one or more queues 111. The queues 111 may be based on available agents 106, agent skill sets, selected services, or the like. A customer identifier 114 may be placed in the virtual queue 110 to identify the customers 104 and order of the customers 104 in the queue 111. The customer identifier may be an alphanumeric identifier associated with the customer, a customer's name, a customer phone number, or the like. As customers are served, the automated queue may remove the customer identifiers 114, which have been served from the queue and advance the next customer identifier 114 to the top or front of the queue 111.

In response to a customer 104, or customer identifier 114 reaching the front of the virtual queue, the automated queue may cause the customer face 202 and a selected service 406 to be transmitted to an agent user interface 10C. The agent 106 may be able to visually identify the customer 104, making locating the customer to provide the services easier. In an example embodiment, the automated queue may also transmit the customer data to the agent user interface 10C.

FIG. 6B illustrates an example agent user interface including customer data 400 and a virtual queue 110 according to an example embodiment. The agent 106 may utilize the customer data 400 and a selected service 406 to provide the customer 104 with the desired goods and/or services. In an example embodiment, the customer data may include the portion of the image 200 including the customer face 202 or the customer face image 401. The agent user interface may display the customer data 400, as discussed in FIG. 6A.

In some instances the automated queue may also cause the virtual queue 110 to be displayed on the agent user interface. The agent 106 may utilize the virtual queue to determine if the service environment is appropriately staffed, identify choke points or slow queues, or the like.

In some example embodiments, the automated queue may include a service environment map 116. The automated queue may cause a customer location 118 to be transmitted to the agent user interface to be displayed on the service environment map 118. The customer location may be determined by the automated queue based on location data from a location sensor, such a portion of the location module, of a customer device 10A or service environment, a customer locator device including a location sensor, such as a coaster, RFID card or the like.

Additionally or alternatively, the automated queue may determine the customer location 118 by tracking the customer 104 based on one or more cameras 34 in the service environment 100. The automated queue may receive a plurality of images from cameras 34 mounted throughout the service environment 100. The images may be associated with image data including a time stamp, an event identifier, such as subject movement, new subject, or the like, and a camera identifier. The location of the customer 104 in one or more image frames and camera angle associated with the camera identifier, may be used to determine the customer location 118, such as by reference point interpolation or triangulation using multiple cameras 34. The agent 106 may utilize the customer location to move greet the customer at their current location. Greeting the customer at their current location may allow the agent to see goods or services that the customer is viewing, which may be advantageous during the transaction.

In an example embodiment, the automated queue may cause an alert on a customer device 10A, in response to the customer 104 reaching the front of the virtual queue 110. The alert may be a text message, a phone call (automated or from an agent 106), an audio alert, a push notification, a tactile alert, such as a vibration, or the like. The alert may indicate the customer 104 that they have reached the front of the virtual queue 110. The customer 104 may move toward an agent 106, service desk, or the like in response to the alert.

In some cases, a method of automated queuing according to an example embodiment may be provided. FIGS. 7 and 8 illustrate block diagrams of some activities that may be associated with one illustrative example of such a method. In some embodiments, the processing circuitry 20 (which may include a processor capable of executing instructions stored in a non-transitory computer readable medium/memory) may be configured to implement a control algorithm for the automated queuing system according to the method.

In an example embodiment, the method may include capturing or receiving an image including at least the face of the customer at operation 512, receiving an indication of a selected service from the customer user interface at operation 536, entering the customer in a virtual queue based on the selected service at operation 538, and cause the customer data and the portion of the image including the customer face to be sent to an agent user interface in response to the customer reaching the front of the virtual queue at operation 540.

In some embodiments, the method may include additional, optional operations, and/or the operations described above may be modified and/or augmented. Some examples of modifications, optional operations, and augmentations are described below, as indicated by dashed lines, such as, causing a customer image prompt to be displayed on a customer user interface at operation 502, detecting a predetermined customer gesture at operation 504, and detecting a customer face location at operation 506. In an example embodiment the method may include causing a repositioning prompt to be displayed on the customer user interface at operation 508 and causing a multiple face prompt to be displayed on the customer user interface at operation 510. In some example embodiments, the method may include identifying areas of the image including the face of the customer at operation 514, comparing the face of the customer to one or more faces in a customer database at operation 516, determining a customer identify at operation 518, and retrieving the customer data from the customer database at operation 520. In an example embodiment, the method may include determining that the customer data is not available at operation 522, causing a request for customer data to be displayed on the customer user interface at operation 524, receiving user input from the customer user interface indicative of costumer data at operation 526, and storing the customer data to the customer database at operation 528. In some example embodiments, the method may include causing the customer data to be displayed on a customer user interface at operation 530 and receiving an indication of the verification of the customer data from the customer user interface at operation 532. In an example embodiment, the method may include causing a service selection menu to be displayed on the customer user interface 534, causing a customer location to be transmitted to the agent user interface at operation 542, and causing an alert on a customer device in response to the customer reaching the front of the virtual queue at operation 544. In some example embodiments, the method may also include generating an alert based on the customer data being indicative of a person of interest at operation 546, receiving an indication of customer arrival at operation 548, and tracking a customer location based on one or more camera images at operation 550.

In an example embodiment, the product analyzer may comprise a processor (e.g. the processor 22) or processing circuitry 20 configured to perform some or each of the operations (502-550) described above. The processor 22 may, for example, be configured to perform the operations (502-550) by performing hardware implemented logical functions, executing stored instructions, or executing algorithms for performing each of the operations.

In some embodiments, the processor 22 or processing circuitry 20 may be further configured for additional operations or optional modifications to operations 502-550. In this regard, in an example embodiment, processing circuitry may be further configured to compare the face of the customer to one or more faces in a customer database retrieve costumer data in response to determining a customer identity, and causing the customer data to be transmitted to the agent user interface in association with the selected service and the at least a portion of the image. In some example embodiments, the processing circuitry may be further configured to cause a prompt to be displayed on customer user interface requesting verification of the determined customer identity and causing the customer data to be transmitted is in response to a customer verification. In an example embodiment, the processing circuitry may be further configured to determine a customer identity based on the comparison of the face of the customer to the one or more faces in the customer database and retrieving the customer data is based on the customer identity. In some example embodiments, the processing circuitry may be further configured to generate an alert in response to the customer identity being indicative of a person of interest. In an example embodiment, the processing circuitry may be further configured to determine customer data is not available based on the comparison of the of the customer to the one or more faces in the customer database, cause a request for customer data to be displayed on a customer user interface, receive user in input from the customer user interface indicative of customer data, store the customer data to a memory in association with the face of the customer. In some example embodiments, the processing circuitry may be further configured to detect a customer face location in the image, and cause the image to be captured based on the face location. In an example embodiment, determining a face location may include determining an acceptable face location in the image and the processing circuitry may be further configured to cause a repositioning prompt to be displayed on a customer user interface in response to determining that the customer face is not within the acceptable face location. In some example embodiments, determining a face location includes determining a plurality of faces in the image and the processing circuitry may be further configured to cause a multiple face prompt to be displayed on the customer user interface. In an example embodiment, the processing circuitry may be further configured to identify areas of the image including the face of the customer. In some example embodiments, the processing circuitry may be further configured to detect a predetermined customer gesture and receiving the image is based on detecting the predetermined customer gesture. In an example embodiment, the processing circuitry may be further configured to cause a service selection menu to be displayed on the customer user interface. In some example embodiments, the processing circuitry may be further configured to determine the location of the customer and cause the location of the customer to be transmitted the agent user interface for display. In an example embodiment, the processing circuitry may be further configured to cause an alert to be transmitted to a customer device in response to reaching the front of the virtual queue. In some example embodiments, the processing circuitry may be further configured to receive an indication of an arrival of the customer and receiving the image is based on receiving the indication of the arrival of the customer. In an example embodiment, the processing circuitry may be further configured to track a customer location based on one or more camera images.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An automated queuing system comprising:
a plurality of service provider computing devices located in at least two different service provider facilities;

at least one customer input device, wherein the customer input device is configured to prompt a customer to select from a plurality of services offered and to receive a customer service request from the customer;

at least one customer communication device located in the first service provider facility, wherein the customer communication device is configured to facilitate communication between a service provider located in a second service provider facility and the customer located in the first service provider facility; and a server comprising a processing circuitry coupled to a memory and configured to execute computer-readable instructions stored in the memory, wherein the computer-readable instructions, when executed, cause the processing circuitry to:

receive availability information for a plurality of service providers from the plurality of service provider computing devices, wherein the availability information comprises an indication as to whether the service providers are each idle or busy;

generate at least a first virtual queue and a second virtual queue, wherein the first virtual queue and the second virtual queue are related to two different types of services that are offered, and wherein the number of queues created correlates to the plurality of services offered;

receive one or more images, wherein at least one image includes an image of a face of a customer in the first service provider facility, from an image-capturing device in the first service provider facility;

receive a selection of one or more desired services from the customer input device;

receive an indication of whether the customer is willing to receive service virtually;

determine a virtual queue of the first virtual queue and the second virtual queue and at least one customer service provider that the customer should be assigned to based at least in part on the availability information associated with the plurality of service providers, the one or more services selected by the customer, and the indication of whether the customer is willing to receive service virtually;

assign the customer to at least one virtual queue position in the first virtual queue and to the at least one customer service provider;

track a location of the customer within the service environment using the one or more images;

in response to the customer reaching the front of the first virtual queue:

notify the customer of the assignment, wherein if the assigned customer service provider is located in the second service provider facility, the customer is assigned to a customer communication device located in the first service provider facility for service of the request by a customer service provider located in the second service provider facility; and transmit information regarding the selected service, the location of the customer within the service environment, and at least a portion of the at least one image including the image of the face of the customer to a service provider computing device;

receive an indication of service completion from a service provider device; and advance the first virtual queue based on the indication of service completion, wherein the computer-readable instructions, when executed, cause the processing circuitry to consider at least one virtual queue for an in-person service provider as well as at least one virtual queue for a remote service provider when determining the virtual queue and the at least one customer service provider that the customer should be assigned to.

2. The automated queuing system of claim 1, wherein the computer-readable instructions are further configured to cause the processing circuitry to:

identify the customer by comparing the at least one image including the image of the face of the customer to images included a customer database, the customer database containing images of faces of one or more known customers;

retrieve customer data in response to determining an identity of the customer; and transmit the customer data to the service provider computing device along with the customer's selected service and the at least one image including the image of the face of the customer.

3. The automated queuing system of claim 2, wherein the computer-readable instructions are further configured to cause the processing circuitry to:

display a prompt, requesting verification of the identity of the customer, on a customer input device; and transmit the customer data in response to receiving the verification of the identity of the customer.

4. The automated queuing system of claim 3, wherein the computer-readable instructions are further configured to cause the processing circuitry to determine whether the customer is likely to purchase additional products based upon recent transactions and generate an alert when the customer is determined to be likely to purchase additional products based upon recent transactions.

5. The automated queuing system of claim 1, wherein the computer-readable instructions are further configured to cause the processing circuitry to:

detect a location of the face of the customer in the at least one image; and capture the at least one image based on the location of the face.

6. The automated queuing system of claim 5, wherein the computer-readable instructions are further configured to cause the processing circuitry to display a repositioning prompt on the customer input device, in response to determining that the face of the customer is not within an acceptable face location.

7. The automated queuing system of claim 5, wherein the computer-readable instructions are further configured to cause the processing circuitry to:

identify a plurality of faces in the at least one image; and display a prompt indicating identification of multiple faces on the customer's user interface.

8. The automated queuing system of claim 1, wherein the computer-readable instructions are further configured to cause the processing circuitry to identify areas of the image including the face of the customer.

9. The automated queuing system of claim 1, wherein the computer-readable instructions are further configured to cause the processing circuitry to:

detect a predetermined customer gesture; and receive the at least one image based on detecting the predetermined customer gesture.

10. The automated queuing system of claim 1, wherein the computer-readable instructions are further configured to cause the processing circuitry to receive an indication of an arrival of the customer and capture the one or more images based in response to the indication of the arrival of the customer.

11. A system comprising:
   a camera;
   a plurality of service provider computing devices located in at least two different service provider facilities, wherein the service provider facilities offer a plurality of services;
   at least one customer input device, wherein the customer input device is configured to prompt a customer to select from the plurality of services and to receive a customer service request from the customer;
   at least one customer communication device located in a first service provider facility, wherein the customer communication device is configured to facilitate communication between a service provider located in a second service provider facility and the customer located in the first service provider facility; and
   a server comprising a processing circuitry coupled to a memory and configured to execute computer-readable instructions stored in the memory, wherein the computer-readable instructions, when executed, cause the processing circuitry to:
      receive availability information for a plurality of service providers from the plurality of service provider computing devices, wherein the availability information comprises an indication as to whether the service providers are each idle or busy, wherein the availability information additionally comprises profile information for each service provider and wherein the profile information is selected from the group consisting of service provider skills, experience level, language proficiencies, and time in position;
      generate at least a first virtual queue and a second virtual queue, wherein the first virtual queue and the second virtual queue are related to two different types of services that are offered, and wherein a number of queues created correlates to the plurality of services offered;
      receive one or more images from the camera, wherein at least one image includes an image of a face of a customer in the first service provider facility;
      receive a selection of one or more desired services from the customer input device;
      display estimated wait times for service in the first facility and for virtual remote service via a second facility;
      receive an indication of whether the customer is willing to receive service virtually;
      determine a virtual queue of the first virtual queue and the second virtual queue and at least one customer service provider that the customer should be assigned to based at least in part on the availability information associated with the plurality of service providers, the one or more services selected by the customer, and the indication of whether the customer is willing to receive service virtually;
      assign the customer to at least one virtual queue position in the first virtual queue and to the at least one customer service provider;
      track a location of the customer within the service environment using the one or more images;
      in response to the customer reaching the front of the first virtual queue:
         notify the customer of the assignment, wherein if the assigned customer service provider is located in the second service provider facility, the customer is assigned to a customer communication device located in the first service provider facility for service of the request by a customer service provider located in the second service provider facility; and
         transmit information regarding the selected service, the location of the customer within the service environment, and at least a portion of the at least one image including the image of the face of the customer to a service provider computing device;
      collect service provider historical data for the plurality of service providers, wherein the historical data comprises efficiency, upsell success, or customer service rating and generate a historical data report for at least one service provider of the plurality of service providers;
      transmit the historical data report to at least the first facility;
      receive an indication of service completion from a service provider device; and
      advance the first virtual queue based on the indication of service completion,
   wherein the computer-readable instructions, when executed, cause the processing circuitry to consider at least one virtual queue for an in-person service provider as well as at least one virtual queue for a remote service provider when determining the virtual queue and the at least one customer service provider that the customer should be assigned to.

12. The system of claim 11, wherein the computer-readable instructions are further configured to cause the processing circuitry to:
   identify the customer by comparing the at least one image including the image of the face of the customer to images included a customer database, the customer database containing images of faces of one or more known customers;
   retrieve customer data in response to determining an identity of the customer; and
   transmit the customer data to the service provider computing device along with the customer's selected service and the at least one image including the image of the face of the customer.

13. The system of claim 12, wherein the computer-readable instructions are further configured to cause the processing circuitry to:
   display a prompt, requesting verification of the identity of the customer, on the customer input device; and
   transmit the customer data to the service provider computing device in response to receiving the verification of the identity of the customer.

14. The system of claim 12, wherein the computer-readable instructions are further configured to cause the processing circuitry to determine whether the customer is likely to purchase additional products based upon recent transactions and generate an alert when the customer is determined to be likely to purchase additional products based upon recent transactions.

15. The system of claim 11, wherein historical data comprises the number of customers each service provider serves per time period or the number/value of sales made by each employee.

16. The system of claim 11, wherein the historical data report indicates efficiency of each service provider with particular service requests, profitability of each service provider, timeframes which are the busiest or most productive, or productivity by facility.

17. The system of claim 11, wherein the computer-readable instructions are further configured to cause the processing circuitry to:
  calculate the estimated wait time for service.

* * * * *